Fig.2

Jan. 10, 1933.  E. G. MONSON ET AL  1,894,049
POLE PUNCTURING MACHINE
Filed Jan. 7, 1931  6 Sheets-Sheet 4

Inventors
Edwin G. Monson and
Harry E. Cullen
By Caswell & Lagard
Attorneys

Patented Jan. 10, 1933

1,894,049

UNITED STATES PATENT OFFICE

EDWIN G. MONSON AND HARRY E. CULLEN, OF MINNEAPOLIS, MINNESOTA, ASSIGNORS TO MacGILLIS & GIBBS COMPANY, OF MILWAUKEE, WISCONSIN, A CORPORATION OF WISCONSIN

POLE PUNCTURING MACHINE

Application filed January 7, 1931. Serial No. 507,125.

In the treatment of poles for the preservation thereof, the poles are usually placed in a bath of some suitable preserving compound or preparation and allowed to remain a sufficient length of time to cause the penetration of the preparation the desired depth into the pole. This time is greatly reduced where the outer skin of the pole is pierced as by mechanical means to permit the preparation to enter into the softer and more porous portion of the wood so as to be more readily absorbed thereby. The instant invention relates to machines for punching holes in poles for this purpose and particularly to machines in which the poles are moved horizontally along the ground, brought under a ram or punching head having a row of punching tools thereon and turned to feed the pole circumferentially as the punching head successively operates upon the pole.

An object of the invention resides in providing a pole puncturing machine in which a number of independent tools are employed which operate in a manner to uniformly puncture the surface of the pole regardless of the shape or formation of the pole and regardless of its angular position with respect to the puncturing machine.

Another object of the invention resides in providing a pole puncturing machine which will operate equally as well on crooked poles.

A still further object of the invention resides in providing fluid controlled means for equalizing the pressure applied to the various punching tools.

Another object of the invention resides in providing a feeding device for turning the pole and in further providing an operating mechanism therefore whereby the feeding of the pole is accomplished in a relatively short time allowing a greater length of time for the operation of the punching apparatus.

An object of the invention resides in providing separate pole turning means simultaneously applicable to the pole at different locations thereon and in providing equalizing means between said pole turning means.

Another object of the invention resides in providing each of said pole turning means with a revoluble member and in driving said members through a differential.

A still further object of the invention resides in driving said revoluble members through a worm and worm wheel to hold said members locked upon cessation of rotation of the operating mechanism therefor.

Another object of the invention resides in constructing the operating mechanism for the feeding mechanism with a ratchet wheel and a pawl, said pawl having a return stroke and a power stroke for giving said ratchet wheel a step by step movement.

A feature of the invention resides in employing a disc coaxially journaled with said ratchet wheel and having a cam surface thereon and in further providing said pawl with a cam adapted to engage said cam surface.

An object of the invention resides in constructing said cam so as to render the pawl inoperative during certain of the power strokes thereof.

Another object of the invention resides in providing a crank having a connecting rod pivoted thereto for operating said pawl and in running said disc at a speed one-half as great as said crank.

A still further object of the invention resides in constructing the machine with a base and a frame work and in providing a turn table rotatably mounted on said base for supporting said frame work.

A feature of the invention resides in providing a lift within said frame work rotatable relative to said base and in providing a second lift without said frame work operating in unison to raise a pole into position to be engaged by the feeding mechanism.

An object of the invention resides in constructing said first named lift with supporting rollers adapted to conform to the contour of the pole, said first named lift being rotated relative to said base through the weight of a pole resting upon said rollers to cause the rollers thereof to extend in the same direction as the axis of the pole at the supported portion thereof.

Another object of the invention resides in keying said first named lift to said frame work to cause corresponding rotation of the frame upon rotation of the lift occasioned through the weight of the pole so as to present the punching tools along an element of the pole regardless of the position of the axis of the pole at the locality being punched.

Another object of the invention resides in constructing the frame with a spline and the first named lift with a keyway movable along said spline whereby the lift may be raised and lowered without interference and whereby the frame work may be rotated with the lift.

Other objects of the invention reside in the novel combination and arrangement of parts and in the details of construction hereinafter illustrated and/or described.

Figures 1, 6:
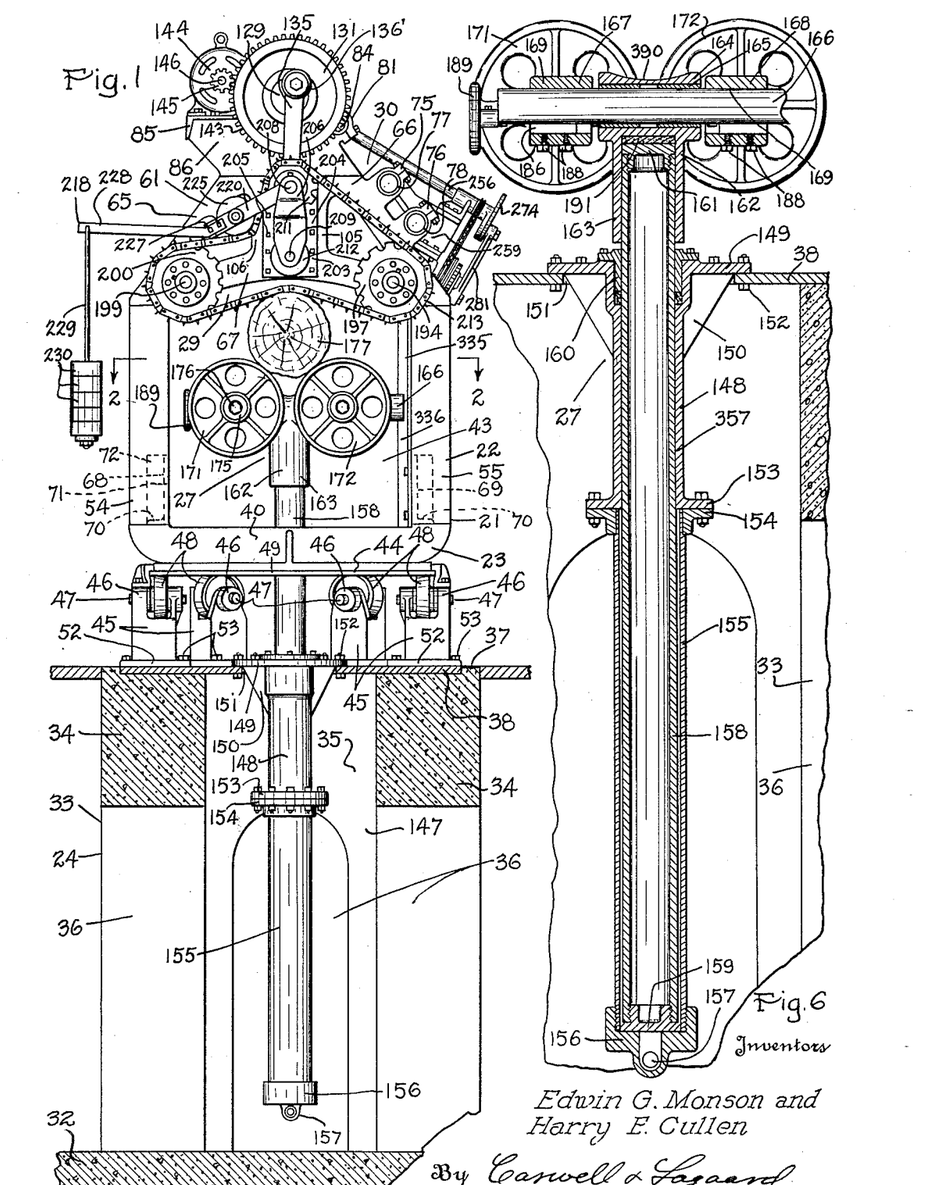
Fig. 1 is an end elevational view of a pole puncturing machine illustrating an embodiment of our invention without the pole delivery apparatus and showing the foundation therefor in section.
Fig. 6 is a vertical longitudinal sectional view of the main lift of the invention.
Figure 2:
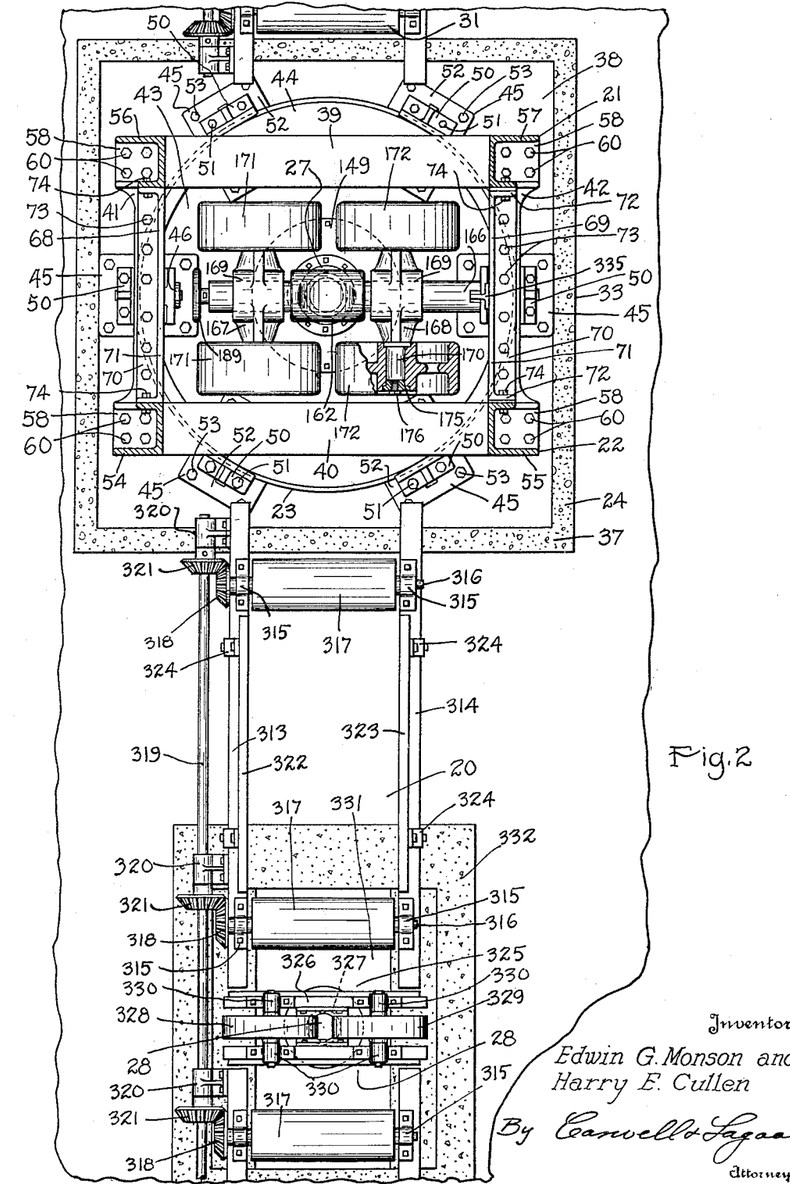
Fig. 2 is a plan sectional view of the pole puncturing machine and a portion of the pole delivery apparatus taken on line 2—2 of Fig. 1 and drawn to a slightly larger scale than Fig. 1.

To more readily explain the construction and operation of our invention the same will be first briefly described in general. Referring to Fig. 2, the poles are brought to the machine by a conveyor 20 which runs from the pole yard or any other locality where the poles are stored. This conveyor leads up to the pole puncturing machine which I have indicated in its entirety at 21. The pole puncturing machine as best shown in Fig. 1 comprises a frame work 22 which is rotatably mounted through a turn table 23 on a suitable foundation 24. The frame work 22 is open to receive the end of the pole which is brought into the same by means of a conveyor 20. At the upper portion of the frame work 22 is disposed a vertically slidable ram 25 (Fig. 4) which is provided with a number of independent punching tools 26 adapted to penetrate the outer skin of the pole and render the same more porous. Within the frame work 22 is arranged a lift 27 which operating in conjunction with a second lift 28 disposed without the puncturing machine and in the conveyor 20 serve to elevate the pole above said conveyor 20 to bring the same in operative engagement with a feeding device 29 adapted to turn the pole step by step so that the ram 25 may punch the pole at spaced localities about the periphery thereof. The feeding mechanism 29 is driven from an intermittent operating mechanism 30 which serves to give the pole a step by step movement after each operation of the punching head or ram 25. When the entire periphery of the lower end of the pole has been properly punched, the pole is lowered through the lifts 27 and 28 upon the conveyor 20. This conveyor is then set in operation and the pole advanced to a conveyor 31 similar to the conveyor 20 by means of which the pole is removed from the machine. These various parts will now be described in detail.

The foundation 24 which supports the pole puncturing machine 21 is preferably constructed of concrete and comprises a footing 32 of suitable proportions to withstand the shock imparted to the same. Upon this footing is built a hollow wall structure 33 having side walls 34 and end walls 35. These walls are cast together and are provided with arched openings 36 therein leaving L-shaped piers at the corners of the structure and leaving the upper portion thereof continuous as most clearly shown in Fig. 1. Upon the top of the wall structure 33 is disposed a flat plate 38 which is set into the concrete flush with the upper surface 37 thereof and which forms a support for the superstructure of the pole puncturing machine which will be presently more fully described. This plate may be anchored to the concrete in the customary manner. Such construction being well known in the art has not been illustrated in this application.

The turn table 23 which constitutes a portion of the frame work 22 as best shown in Fig. 2 comprises two transverse frame members 39 and 40 and two longitudinal frame members 41 and 42. These frame members are spaced from one another as illustrated to provide an open space 43 therebetween. On the under side of these frame members is formed a circular track 44 by means of which the turn table is supported. Circumferentially arranged below the track 44 and equally spaced from one another are a number of standards 45 which are constructed with bearings 46 journaling horizontal shafts 47. These shafts have attached to them rollers 48 which are adapted to ride along the under side of the track 44 and to support the structure mounted on the turn table. The standards 45 are constructed with flanges 52 which rest upon the plate 38 previously referred to. These standards are secured to said plate through bolts 53 which pass through said flanges and are screwed into the plate 38. To hold the track 44 in place upon the rollers, said track is constructed with an outwardly extending flange 49 disposed below the edge thereof. A number of keepers 50 secured to the standards 45 through bolts 51 engage the flange 49 and retain the track in proper position upon the rollers 48. These keepers in addition guide the track for rotational movement.

Figure 3:
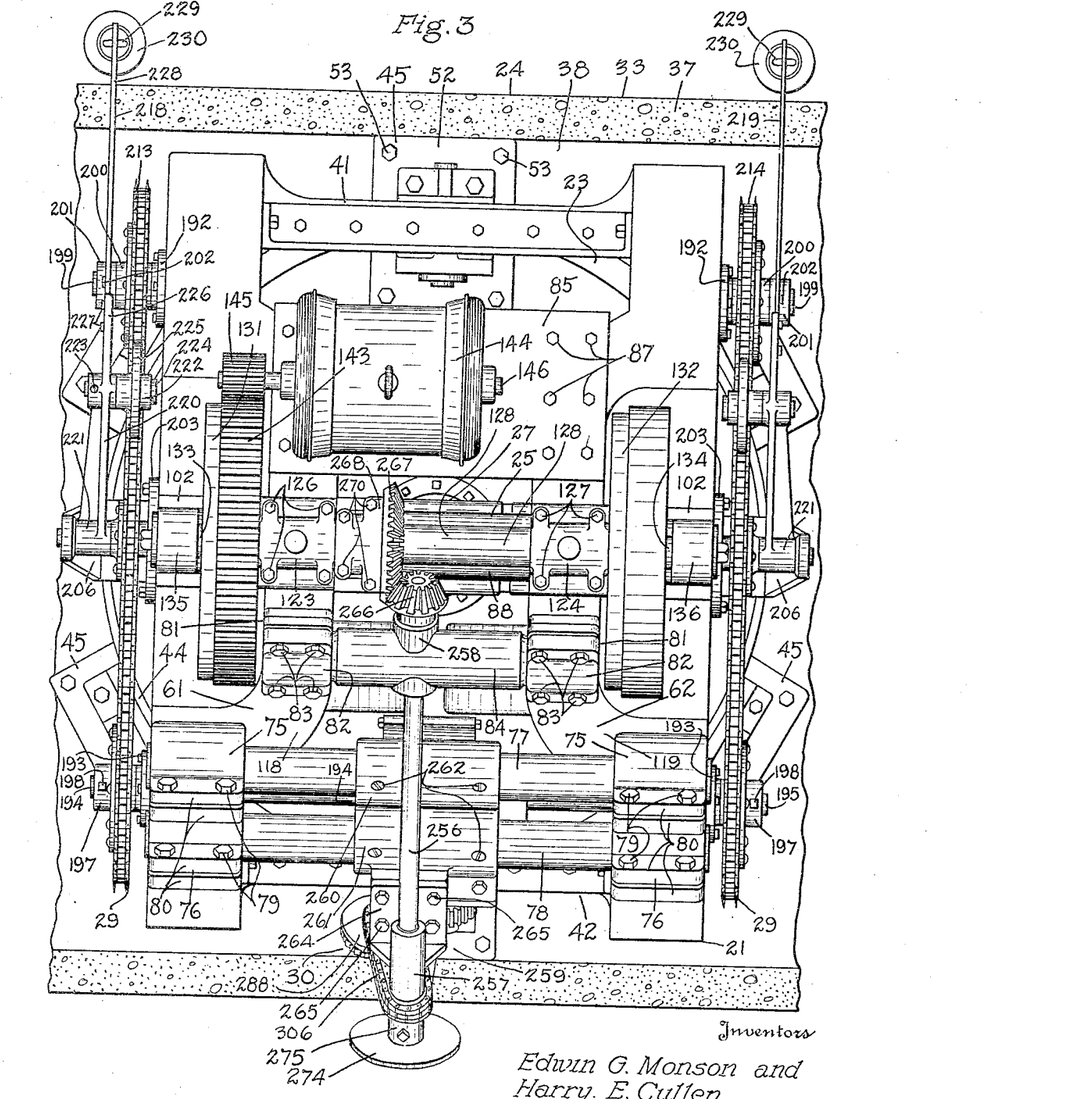
Fig. 3 is a plan view of the structure shown in Fig. 1 drawn to a larger scale than Fig. 1.
Figures 4, 7:
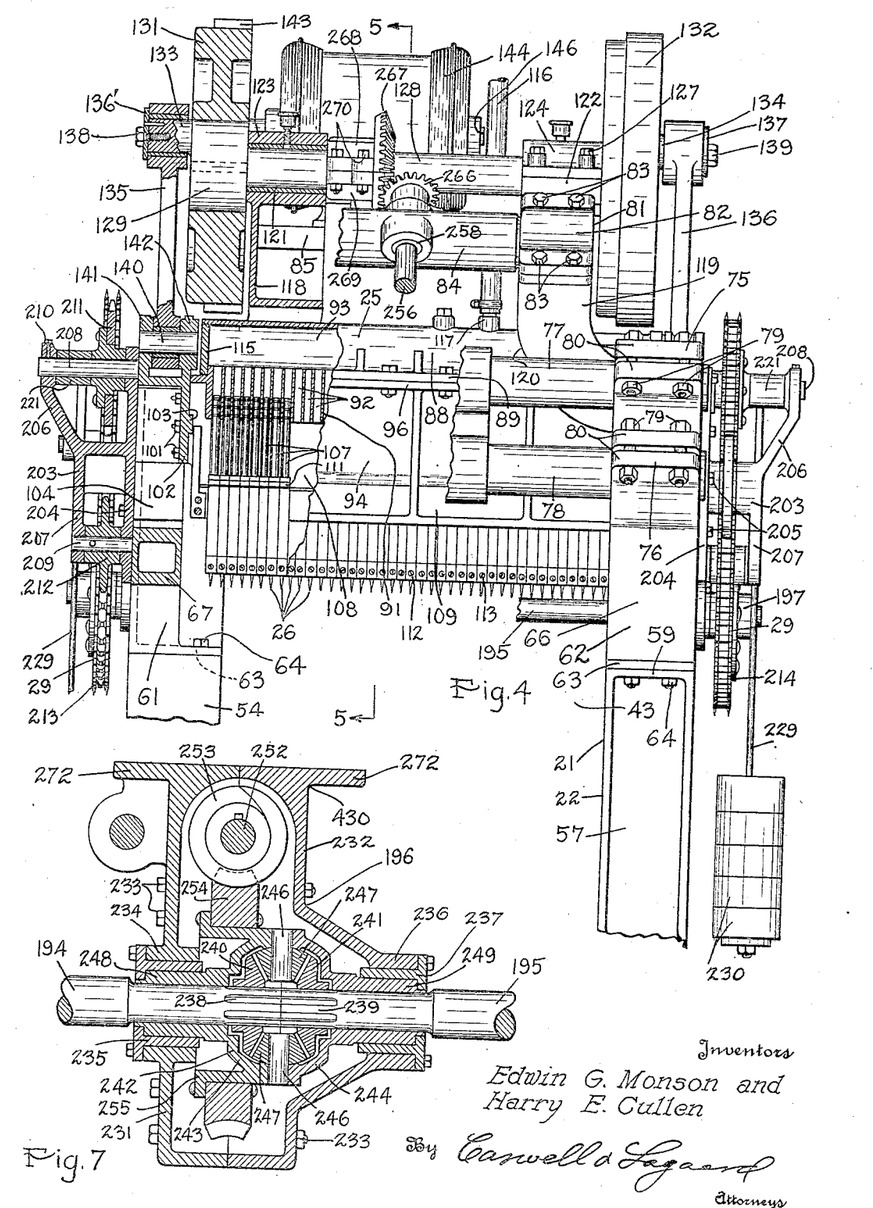
Fig. 4 is a fragmentary side elevational view of the machine with portions cut away to show the construction thereof and drawn to approximately the same scale as Fig. 3.
Fig. 7 is a longitudinal sectional view of the differential mechanism of the invention taken on line 7—7 of Fig. 5 and drawn to a somewhat larger scale.

The frame work 22 in addition to the turn table 23 includes four uprights 54, 55, 56 and 57. These uprights are preferably constructed as castings and are formed at their extreme ends with bearing plates 58 and 59. The bearing plates 58 are bolted to the transverse frame members 39 and 40 of the turn table 23 through bolts or cap screws 60 to rigidly hold the same attached thereto. The upper part of the frame work 22 includes two spaced A-frames 61 and 62 best shown in Figs. 1, 3 and 4. These A-frames are constructed with bases 63 which are bolted to the bearing plates 60 of the various uprights through bolts 64 (Fig. 4). The A-frames 61 and 62 further comprise inclined legs 65 and 66 connected together through bars 67 and are preferably constructed as castings formed either U-shaped or rectangular in cross section as will be best comprehended from the drawings. The uprights 54, 55, 56 and 57 are connected together and braced at their lower ends through two struts 68 and 69. These struts are formed with bases 70 which rest upon the longitudinal frame members 41 and 42 of the turn table 23 and with webs 71 issuing upwardly therefrom. The said struts are further provided with end flanges 72 which are adapted to abut against the various uprights. The struts 68 and 69 are secured to the longitudinal frame members 41 and 42 through bolts 73 which pass through the flanges 69 and are further secured to the uprights through bolts 74 which pass through the end flanges 72 of said struts. In this manner, the lower portion of the frame work 22 adjacent the turn table 23 is rigidly braced and connected together.

The two A-frames 61 and 62 are braced as follows. On each of these A-frames is formed two clamps 75 and 76 simulating split bearings. In these clamps are mounted two tubes 77 and 78 which are rigidly clamped within said clamps by means of bolts 79 extending through the flanges 80 thereof. These tubes serve as supports for other portions of the device as will be presently described in detail. In addition to the clamps 75 and 76 two other clamps 81 are employed which are situated near the upper ends of the A-frames 61 and 62. These clamps are similar to clamps 75 and 76 excepting that the same are constructed with removable caps 82 adapted to be bolted to the frame structure through cap screws 83. Within these two clamps is mounted a bar 84 which similar to the tubes 77 and 78 serve to support other portions of the device. Across the extreme upper ends of the A-frames 61 and 62 and along the side thereof opposite the tubes 77 and 78 is disposed a longitudinally extending inverted channel 85. This channel is mounted on brackets 86 formed on the upper ends of the A-frames 61 and 62 and is attached to said brackets through bolts 87 (Fig. 3). By means of the construction described, the frame work 22 is rigidly tied together and braced so as to withstand the strain imparted to the same in the operation of the machine.

Figures 5, 9:
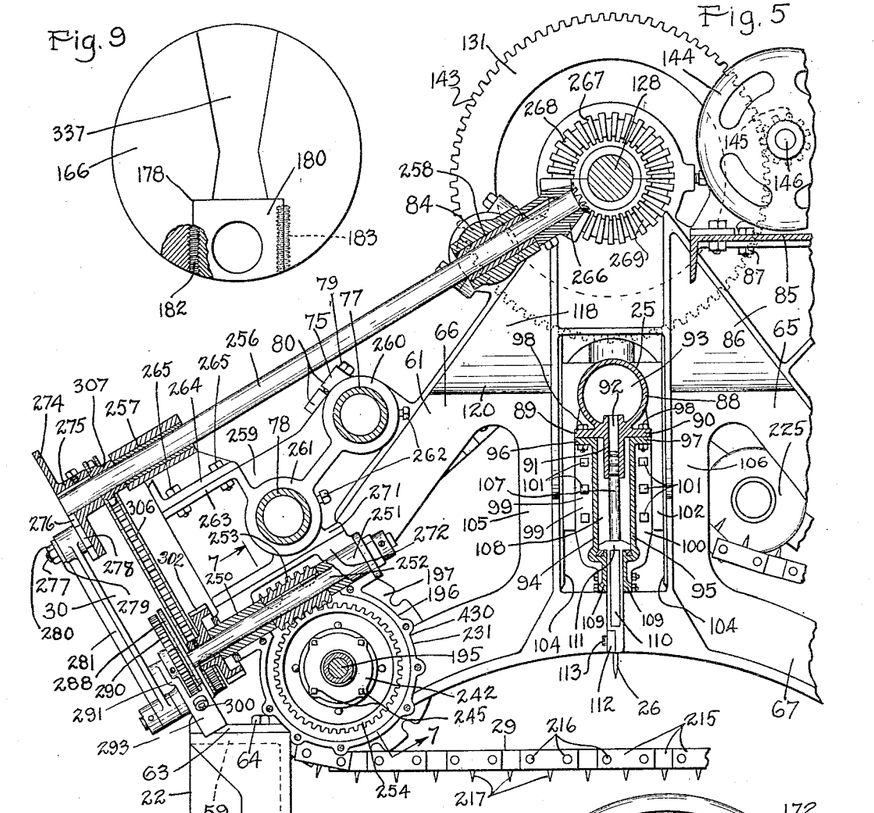
Fig. 5 is a fragmentary cross sectional view taken on line 5—5 of Fig. 4 and drawn to a slightly larger scale than Fig. 4.
Fig. 9 is an end view of the supporting shaft of the structure shown in Fig. 8 and drawn to a still larger scale.

The ram 25 previously referred to which carries the punching tools 26 for puncturing the outer surface of the pole is best shown in Figs. 4 and 5 and will now be described in detail. This device comprises a tubular head 88 which extends substantially across the machine. This head is formed with outwardly extending flanges 89 and 90 and is further formed with a cylinder block 91 depending therefrom. The cylinder block 91 is bored with a plurality of vertical parallel bores 92 constituting cylinders and communicating with the chamber 93 formed within the head 88. Below the head 88 is disposed two parallel plates 94 and 95 which are formed with longitudinal flanges 96 and 97 adapted to be bolted to the flanges 89 and 90 of the head 88 through bolts 98. The plates 94 and 95 are further constructed with end flanges 99 and 100 which in turn are bolted through bolts 101 to guide blocks 102 positioned within the A-frames 61 and 62. The head 88 is keyed to the guide blocks 102 through keys 103 illustrated in Fig. 4. The end blocks 102 are guided for sliding movement in guideways 104 formed in the central portions of the A-frames 61 and 62 and disposed along pairs of uprights 105 and 106 formed in said A-frames. These uprights are connected to the bars 67 of the A-frames as well as to the legs 65 and 66 thereof to form a rigid and substantial construction.

The cylinders 92 of the ram 25 are fitted with a number of pistons 107 which extend downwardly below the cylinder block and into the space 108 between the two plates 94 and 95. At the lower ends of these plates are formed guide members 109 between which are slidably mounted the tool holders which are indicated at 110. These tool holders are constructed with heads 111 which move along the inner walls of the plates 94 and 95, and engage the upper ends of the guide members 109 to prevent said tool holders from dropping out of the guideways formed by said members. The tool holders 110 are of a depth such that the same fit snugly between the guide members 109 and are of a width equal to the distance between the bores 92 so that said guide members fit snugly against one another. At the lower ends of the tool holders 110 are formed clamps 112 which are secured to said tool holders through cap screws 113. These clamps serve to hold the punching tools 26 in place so that the same may operate to engage the surface of the pole and puncture the same.

The tubular head 88 of the ram 25 is provided at its ends with end closures 115 by means of which the chamber 93 formed within said head is closed. This chamber communicates with a source of fluid under pressure through a hose 116 which is attached to a hose connection 117 formed on said head. When a suitable fluid under pressure, as for example air, is pumped into the chamber 93 through the hose 116, the pistons 107 are urged downwardly to force the tool holders 110 to their lowermost positions as shown in Figs. 4 and 5. When the ram 25 is reciprocated and the tools 26 projected against the surface of the pole to be punctured, these tools force the pistons 107 upwardly compressing the fluid within the chamber 93. The pressure applied to each of these tools is hence equalized so that in the event that one of the tools strikes a knot or other hard surface, the movement of that particular tool is retarded without affecting the movement of the others. Also in the event that the pole is not straight or in alignment with the protruding ends of the various tools 26, said tools can be made to puncture the pole throughout its extent due to the equalization of the pressure upon the tools afforded through the fluid within the chamber 93. In addition, this construction operates as a buffer or shock absorber for absorbing the shock imparted to the ram 25 when the punches strike the pole. In the operation of the device where compressed air is used in the tubular head 88, I prefer to partially fill the head with oil so that the cylinders 92 and the guides 109 are at all times properly lubricated to permit the device to function in the most efficient manner.

For reciprocating the ram 25, the following construction is employed which is best shown in Figs. 1, 3, 4 and 5. The extreme upper portions 118 and 119 of the A-frames 61 and 62 carrying the clamps 81 are preferably offset inwardly as shown in Figs. 4 and 5 and as indicated at 120. On the upper ends of these portions of the A-frames are formed bearings 121 and 122 which are fitted with caps 123 and 124 bolted thereto through bolts 126 and 127. These bearings serve to journal a longitudinally extending shaft 128 from which the ram 25 is operated. This shaft, as shown in Fig. 4, is formed at the ends thereof with circular collars 129 to which the crank pins of the device are attached and hold the said shaft from endwise movement within the bearings 121 and 122. These collars have rigidly keyed to them fly wheels 131 and 132 which assist in giving said shaft sufficient momentum to operate the ram as will become more readily apparent. The collars 129 have issuing outwardly therefrom crank pins 133 and 134 which project outwardly beyond the outer surface of the fly wheels 131 and 132. Upon these crank pins are journaled connecting rods or pitmen 135 and 136 which are held in place upon said crank pins through caps 136' and 137. These caps are secured to said crank pins through cap screws 138 and 139 which are screwed into said pins. The lower ends of the connecting rods 135 and 136 are connected to wrist pins 140 which are mounted in bearings 141 and 142 formed in the guide blocks 101 and 102. It will readily become apparent with this construction that upon rotation of the shaft 128 the crank pins 133 and 134 serve to reciprocate the ram 25 so as to drive the tools 26 into the surface of the pole.

For operating the shaft 128 I employ a motor 144 which is mounted upon the channel members 85 which is arranged with the web horizontally to provide a shelf for this purpose. The motor 144 may be attached to this shelf in any suitable manner. This motor is constructed with the usual armature shaft 146 which has attached to it a spur pinion 145. The fly wheel 131 is constructed with gear teeth 143 which mesh with the pinion 145. As the armature shaft 146 rotates, the shaft 128 is driven and the ram reciprocated as previously described.

The lift 27 is illustrated in detail in Figs. 1, 2, 6 and 8. As previously stated, the foundation 24 is formed hollow as designated at 147 to receive the submerged portion of the same. This lift comprises a cylinder 148 which extends through an opening 151 centrally disposed in the plate 38 supported on the foundation 24. The cylinder 148 is formed at its upper end with an outwardly extending flange 149 which is braced with respect to said cylinder through diagonal ribs 150 connected thereto to stiffen the same.

The flange 149 of cylinder 148 is bolted to said plate through bolts or cap screws 152. At the lower end of said cylinder is provided another outwardly extending flange 153. This flange has attached to it the flange coupling 154 of a pipe 155 which forms a continuation of the cylinder 148, but which is somewhat larger in diameter. The lower end of the pipe 155 has screwed upon it a cap 156 provided with a pipe connection 157 which serves to bring the interior of the pipe 155 and cylinder 148 into communication with a pipe line connected with a source of supply of a suitable fluid under pressure. The cylinder 148 is accurately bored as indicated at 357 to receive a tubular piston 158 preferably constructed of a pipe ground to fit snugly within the bore 357 of said cylinder. The piston 158 is provided with a cap 159 at the lower end thereof and has attached to it at its other end the supporting structure for the pole which will presently be described in detail. To provide a tight joint between the cylinder 148 and piston 158 a stuffing box 160 is employed which is of ordinary construction. It will readily become apparent that when a fluid under pressure such as oil or compressed air is forced through the pipe 157 into cylinder 148 that the piston 158 raises, lifting the structure carried thereby. By constructing the pipe 155 somewhat larger in diameter than the bore of the cylinder 148 a minimum amount of friction is produced and the disadvantages otherwise occurring from inaccuracies in the construction of the cylinder and the piston are eliminated.

The upper end of the piston 158 is closed through a cap 161 similar to the cap 159. This end of the piston carries a head 162 which is formed with a vertically extending boss 163 and a horizontally extending boss 164 integrally connected together. The boss 163 is bored to fit snugly over the upper end of the piston 158 while the boss 164 is provided with a bearing 165 rotatably supporting a transverse horizontal shaft 166. The head 162 is cushioned relative to the piston 158 through a resilient pad 191 of some suitable material interposed between the cap 161 and the upper end of the boss 163. The shaft 166 has slidably mounted upon it two cross arms 167 and 168 which are formed with bearings 169 intermediate the ends thereof through which the shaft 166 extends. These cross arms are further provided at the ends thereof with stub shafts 170 on which are rotatably mounted wheels or rollers 171, and 172. These rollers may be attached to said stub shafts in any suitable manner as through hub caps 175 (Fig. 2) and cap screws 176. At the normal position of the lift 27 the rollers 171 and 172 are below the level of the pole when moved into the machine through the conveyor 20. When the conveyor 20 is stopped the pole comes to rest within the machine and the piston 158 of lift 27 may be elevated. This brings the pole into engagement with the rollers of the lift as clearly shown in Fig. 1 in which the pole is designated at 177. The pole is then brought up to a position where the same may be acted upon by the punching tools 26 of the ram 25.

To accommodate different sizes of poles the distance between the rollers 171 and 172 is made adjustable. This is accomplished as follows. In the lower portion of the shaft 166 is cut a relatively wide longitudinally extending groove or keyway 178. In this keyway is mounted a shaft 179 which is journaled in two bearings 180 and 181 best illustrated in Fig. 9. These bearings are preferably rectangular in form to snugly fit within the groove 178, and are held in place within said groove through two screws 182 and 183 which are screwed partly into said bearings and partly into the portion of the shaft 166 lying adjacent said bearings. This construction is clearly brought out in Fig. 9. Toward the end of the shaft 179, the same is constructed with right and left hand threads 184 and 185 which are adapted to screw into threaded nuts or splines 186. These splines fit within keyways 187 in the bearings 169 of cross arms 167 and 168, and are held in place therein through cap screws 188. It will readily become apparent that as the shaft 179 is rotated, the cross arms 167 and 168 may be simultaneously moved toward or from the ends of said shaft to vary the space between the rollers 171 and 172.

For the purpose of rotating the shaft 179 the same may be provided at one end thereof with a hand wheel 189 secured thereto through a set screw 190. To limit the movement of the cross arms 167 and 168, collars 389 are attached to the shaft 179 at the inner ends of the threads 184 and 185. In order to handle a relatively large pole the upper portion of the bearing 164 of head 162 is cut away as indicated at 390 in Figs. 6 and 8 to allow the pole to descend as far as possible without interference from the supporting structure for the rollers 171 and 172.

When the lift 27 is raised to bring the pole 177 in the position shown in Fig. 1 the same is engaged by the feeding mechanism 29 and progressively given a step by step rotation to present fresh portions of the outer surface of the pole for engagement with the tools 26 of the ram 25. This feeding mechanism will now be described in detail. Attached to the sides of the A-frames 61 and 62 of the frame work 22 of the machine are bearings 192 and 193. These bearings are disposed near the lower ends of the legs 65 and 66 of said A-frames as best shown in Fig. 1. Journaled in the bearings 193 are two shafts 194 and 195 which are connected together intermediate their ends through a differential indicated at 196 and shown in detail in Fig. 7. The ends of the shafts 194 and 195 have attached to them sprocket wheels 197 which may be secured thereto through set screws 198. The bearings 192 have rigidly mounted therein stub shafts 199 which have journaled upon them similar sprocket wheels 200. These sprocket wheels are held in place upon said stub shafts through collars 201 which are secured to said shafts through set screws 202. On each side of the A-frames 61 and 62 and covering the guideways 104 therein are two castings 203 formed with plate-like bases 204 adapted to be bolted to said A-frames through bolts or cap screws 205. The castings 203 are constructed with outwardly extending brackets 206 and 207 which together with the plate-like bases 204 form bearings to support two short shafts 208 and 209, (Fig. 4). The shaft 208 is rigidly secured in its bearings through a set screw 210 and has rotatably mounted upon it an idler sprocket wheel 211 which is slightly smaller than the sprocket wheels 197 and 200 but which is in the same plane. The shaft 209 has pinned to it an idler wheel 212 disposed in the plane of the other sprocket wheels which is similar to the sprocket wheel 211 excepting that the same may be formed without teeth if desired.

Two specially constructed chains 213 and 214 pass over the respective sets of sprocket wheels being disposed one on each side of the machine and extending outwardly beyond the frame work 22 thereof. These chains consist of links 215 which are pivoted together through pintles 216 in the ordinary manner. The various links 215 of these chains are provided with prongs 217 extending outwardly therefrom which are adapted to engage the surface of the log and to rotate the same on the rollers 171 and 172 as the chains are moved.

When the lift 27 is operated to elevate the pole 177 as shown in Fig. 1 the upper surface thereof comes into contact with the prongs on the chains 213 and 214. This puts tension in said chains which is taken care of through two chain tighteners indicated in their entireties at 218 and 219. Both of these chain tighteners being identical in construction only the tightener 218 will be described. This chain tightener comprises an arm 220 which is formed with a boss 221 at one end thereof. The boss 221 of arm 220 is journaled on the shaft 208 to allow said arm to swing vertically. Intermediate the ends of the arm 220 is formed another boss 222 which has attached to it through a set screw 223 a headed pin 224. The pin 224 has rotatably mounted upon it an idler wheel 225 which may be constructed with or without teeth as desired, and which engages the chain 213. The outer end 226 of the arm 220 has attached to it through bolts 227 a lever 228. This lever has pivotally connected to it a hanger 229 which supports a number of weights 230. These weights serve to swing the arm 220 downwardly and to apply tension to the chain 213 so as to retain the prongs 217 thereof in contact with the pole 177 when said pole is elevated into engagement with the lower run of said chain.

The differential mechanism 196 for operating the shafts 194 and 195 is shown in detail in Fig. 7. This mechanism includes a housing indicated in its entirety at 430, which comprises two halves 231 and 232 bolted together through bolts 233. The half 231 is formed with a boss 234 bored to receive a bearing 235 while the half 232 is similarly constructed with a boss 236 bored to receive a bearing 237. The ends of the two shafts 194 and 195 abut one another within the interior of the case 230 and are formed with splines 238 and 239. These shafts have mounted upon the ends thereof bevel gears 240 and 241, which are splined to said shafts through the keys 238 and 239. Rotatably mounted upon the shafts 194 and 195 and within the housing 430 is a cage 242 which may be constructed in halves 243 and 244 bolted together through bolts 245 as best shown in Fig. 5. The cage 242 supports a plurality of radially disposed pins or shafts 246 which rotatably carry bevel pinions 247 meshing with the bevel gears 240 and 241. The two halves 243 and 244 of the cage 242 are provided with bushings 248 and 249 which are journaled in the bearings 235 and 237 of housing 430 and which rotatably support the two ends of the shafts 194 and 195 in proper relation to one another. The housing 430 in addition to the bearings 235 and 237 is provided with two other bearings 250 and 251 which are clamped in place within said housing between two halves 231 and 232 thereof. These bearings journal a shaft 252 which has keyed to it a worm 253. The worm 253 meshes with a worm wheel 254 which is riveted to a flange 255 on the cage 242. As the shaft 252 is rotated, the shafts 194 and 195 are rotated at a reduced speed and a differential movement imparted to said shafts according to the rate of travel of the two chains 213 and 214 operated thereby.

The intermittent operating mechanism 30 includes a drive from the shaft 128 which is best shown in Figs. 3 and 5. This drive includes a downwardly sloping shaft 256 which is journaled in two bearings 257 and 258. The bearing 258 is formed in the bar 84 connecting the two A-frames 61 and 62 together while the bearing 257 is attached to a mounting 259 secured to the two tubes 77 and 78. The mounting 259 is constructed with bored bosses 260 and 261 which fit over said tubes and which may be secured thereto through set screws 262 or in any other desired manner. The mounting 259 is provided with a shelf 263 while the bearing 257 is provided with a base 264 resting upon said shelf and bolted thereto through bolts 265. In this manner the bearing 257 is rigidly attached to the frame structure of the machine so as to rotatably support the lower end of the shaft 256.

The shaft 256 is rotated at a uniform rate of speed through a bevel pinion 266 keyed to the extreme end thereof. This bevel pinion meshes with a bevel gear 267 mounted on the shaft 128. The gear 267 is preferably constructed in halves designated at 268 and 269, which are bolted together through bolts 270. By means of this construction the gear 267 may be attached to the shaft 128 without being slid over the end of the same thereby permitting of the formation of the collars 129 integral with said shaft.

Figures 10, 11, 12, 13, 14:
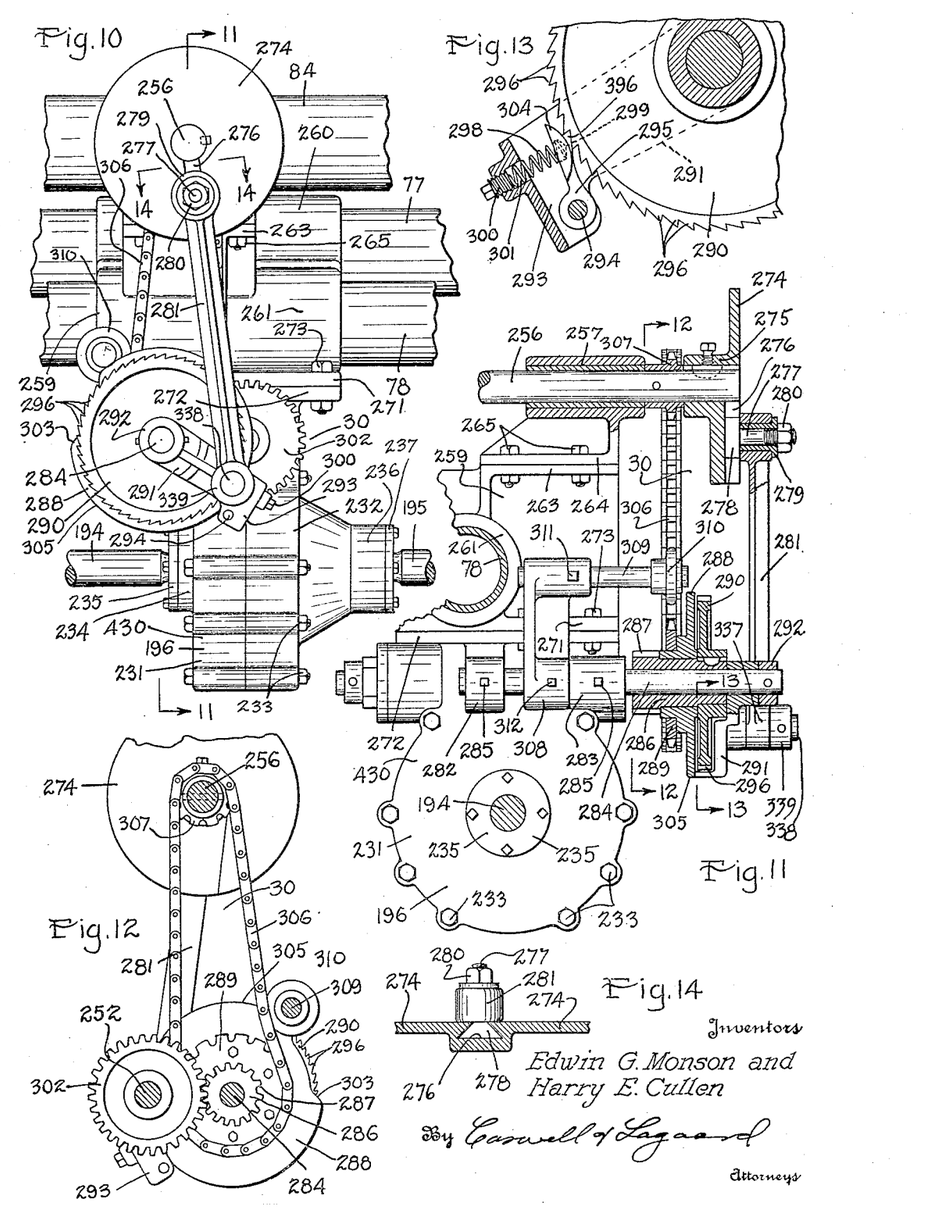
Fig. 10 is an end elevational view of the feeder mechanism illustrated in Fig. 5 taken along a line parallel to the axis of the feeder shaft and drawn to a larger scale.
Fig. 11 is a cross sectional view taken on line 11—11 of Fig. 10.
Fig. 12 is a sectional view taken on line 12—12 of Fig. 11.
Fig. 13 is an enlarged fragmentary sectional view taken on line 13—13 of Fig. 11.
Fig. 14 is an enlarged fragmentary detail view taken on line 14—14 of Fig. 10.

The mounting 259 is constructed with a second shelf 271 integral therewith while the differential housing 430 is formed with a base 272 which is attached to the shelf 271 through bolts 273 (Fig. 11). In this manner the shaft 256 is rigidly supported with respect to the shaft 252 so that an effective drive may be had between the two.

The feeding mechanism 30 further includes a drive between the shaft 256 and the shaft 252 which will now be described in detail. Secured to the end of the shaft 256 is a disc 274 (Figs. 5, 10 and 11). This disc is formed with a boss 275 which fits over the end of said shaft and which is keyed thereto in the customary manner. The disc 274 is constructed with a dovetailed slot 276 best shown in Fig. 14. In this slot is mounted a bolt 277 having a dovetailed head 278 slidable within the dovetailed slot 276. Upon the exterior of this bolt is disposed a flanged sleeve 279 which is clamped in place upon the face of the disc 274 through a nut 280 screwed upon the end of the bolt 277. The sleeve 279 serves as a pivot for a connecting rod 281 which extends downwardly toward the shaft 252 of the differential 196. This connecting rod operates a ratchet mechanism whereby a step by step movement is given to the shaft 252 of the differential 196. This mechanism is constructed as follows.

On the side of the half 231 of the differential case 230 is formed two bearings 282 and 283. In these bearings is mounted a stub shaft 284 which is rigidly secured in said bearings through set screws 285. This shaft has rotatably mounted upon it a sleeve 286 which has cut in one end thereof a spur gear 287. Upon this sleeve is rotatably mounted intermediate the ends thereof a disc 288 which has securely attached to it a sprocket wheel 289. To the outer end of the sleeve 286 is keyed a ratchet wheel 290 formed with ratchet teeth 296 which serves to retain the disc 288 in proper position upon the sleeve 286. Swingably mounted upon the outer end of the shaft 284 is an arm 291 which is held from axial movement on said shaft through a collar 292 pinned thereto. The arm 291 is best shown in Figs. 10, 11 and 13 and is provided with a portion 293 extending outwardly beyond the ratchet wheel 290. This portion of the arm has pivoted to it through a pintle 294 a dog or pawl 295 formed with a tooth 396 adapted to engage the ratchet teeth 296 of the ratchet wheel 290. The tooth 396 of the pawl 295 is held in engagement with the teeth 296 of the ratchet wheel 290 through a compression coil spring 298 which is seated at one end in a socket 299 in said pawl and at its other end against a plug 300 screwed into an opening 301 in the portion 293 of the arm 291. The lower end of the connecting rod 281 is formed with a boss 337 which is pivoted to the arm 291 near the portion 293 thereof through a pintle 338. The pintle 338 is rigidly secured to said arm, and a collar 339 pinned to the end of the pintle 338 holds the connecting rod 281 in place thereon. By means of this construction the ratchet wheel 290 and the gear formed by the gear teeth 287 are given a step by step rotation as the disc 274 rotates. The shaft 252 is driven from the ratchet wheel 290 through the gear 287 which meshes with a spur gear 302 fast on the end of the shaft 252. This construction is best shown in Figs. 5 and 12. As the shaft 256 rotates, shaft 252 is given a step by step movement causing the intermittent feeding of the pole after each puncturing operation upon the same.

In the puncturing of the poles, it is highly desirable to have the pole fed or rotated as quickly as possible to allow a greater length of time for the puncturing operation. Toward this end, the shaft 256 is driven at a fairly high rate of speed and additional structures employed whereby the ratchet wheel 290 is moved very rapidly during the turning of the pole. For this purpose the disc 288 is employed which, as noted in Figs. 10 and 11, is slightly larger in diameter than the ratchet wheel 290. This disc serves as a cam whose outer edge 305 forms the cam surface therefor and which is constructed with a depression 303 extending inwardly from the ratchet teeth 297. A follower 304 (Fig. 13) on the dog 295 is adapted to engage the cam surface 305 of this cam and when in engagement with the outer portion thereof holds the tooth 396 of the dog 295 out of engagement with the ratchet teeth 296 of ratchet wheel 290. When, however, the follower 304 engages the depressed portion 303 of the cam disc 288 the tooth 396 is free to engage the teeth 296 of the ratchet wheel 290 so as to operate the same. The cam disc 288 is driven from the sprocket wheel 289 through a chain 306 which passes over a sprocket pinion 307 fast on the shaft 256. This sprocket pinion is one-half the size of the sprocket wheel 289 so that the disc 288 travels at one-half the speed of the shaft 256. When the depressed portion 303 of the disc 288 is in the path of movement of the dog 295, the dog 295 operates ratchet wheel 290 while, when the said parts are disposed as shown in Figs. 10 and 11, the dog travels free of the ratchet wheel thereby causing the movement of the shaft 252 every other up stroke of the connecting rod 281. It will hence be readily comprehended that the movement of the feeding mechanism is accomplished very rapidly leaving a sufficient time interval between the feeding of the pole in which the puncturing operation may be properly accomplished.

For maintaining the chain 306 tight, a chain tightener is employed which consists of an arm 308 mounted upon the shaft 284 between the bearings 282 and 283. This arm has attached to it an outwardly extending stub shaft 309 which has rotatably mounted upon the outer end thereof an idler wheel 310 engaging the chain 306. The shaft 309 is rigidly held attached to the arm 308 through a set screw 311 while the said arm may be held in adjusted position upon the shaft 284 through another set screw 312. In this manner any desired tension can be placed upon the chain 306 to cause the same to positively drive the disc 288.

The conveyor 20 is illustrated in Fig. 2 and consists of two spaced parallel beams 313 and 314. These beams have mounted upon them at regular intervals bearings 315 which rotatably support shafts 316. The shafts 316 carry rollers 317 disposed between the two beams 313 and 314. Each of the shafts 316 has attached to it a bevel gear 318 by means of which the same is driven. Along the beam 313 is disposed a longitudinally extending shaft 319 which is journaled in bearings 320 attached to said beam. This shaft may be driven through any suitable means and is provided with a number of bevel gears 321 which mesh with the bevel gears 318 and serve to rotate all of the rollers 317 in the same direction. When a pole is placed upon the various rollers 317 and the shaft 319 rotated, the pole is fed in one direction or the other along the conveyor 20 depending upon the direction of rotation of said shaft. To prevent the pole from sliding off the rollers 317, two guards 322 and 323 are employed which rest upon the beams 313 and 314 and are attached thereto through cleats 324. These guards are in the nature of planks which extend upwardly above the elevation of the rollers 317 and assist in guiding the pole in its course of movement along the conveyor 20. The conveyor 31 is constructed in identically the same manner as the conveyor 20 and will hence not be described.

Operating in conjunction with the lift 27, we employ a second lift 325 which is also shown in Fig. 2. This lift may be constructed similar to the lift 27 and will hence not be described in minute detail. This lift comprises a frame structure 326 which is carried by a plunger of piston 327 similar to that of the lift 27. On the frame structure is rotatably mounted two rollers 328 and 329 which are journaled in bearings 330 attached to said frame structure. The entire lift may be mounted in a pit 331 formed in a concrete structure 332. The lift 28 may be simultaneously operated in conjunction with the lift 27 by a controlling system not shown so that both of the lifts may be simultaneously raised to raise the pole at both ends thereof. Although I have shown but a single supplemental lift 28, it can readily be comprehended that as many such lifts as necessary may be employed to properly raise the pole after the same has been delivered to the puncturing machine.

The beams 313 and 314 of the conveyor 20 are supported at one end of each thereof on the concrete structure 332 forming the pit 331. The other ends of these beams reach up to the puncturing machine proper and rest on the foundation 24. If desired additional footings may be provided wherever desired intermediate the lengths of said beams for further supporting the same.

Figure 8:
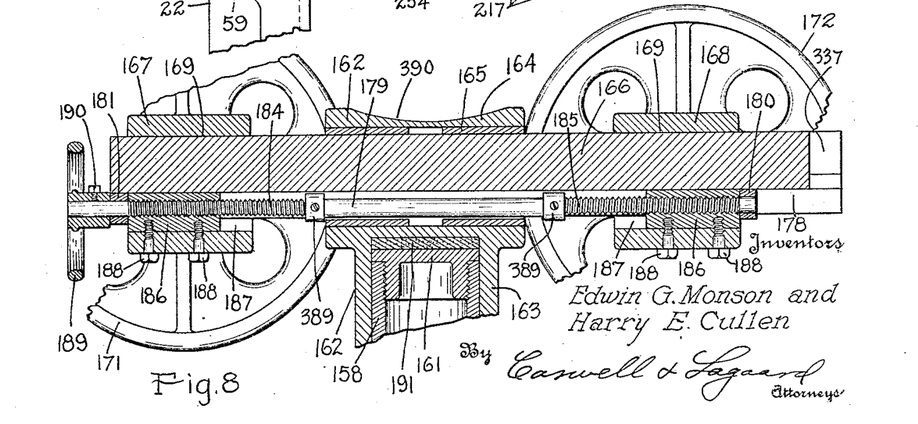
Fig. 8 is a fragmentary longitudinal sectional view of the upper portion of the structure shown in Fig. 6 and drawn to a larger scale.

The lift 27 and the frame work 22 are connected together through a splined connection best shown in Figs. 1, 2 and 8. Attached to the strut 69 of the frame work 22 is an upwardly extending T-bar 335 which is formed with a flange 336 thereof extending inwardly toward the lift 27. This flange serves as a spline and is slidable along a key slot 337 in the end of shaft 166 whereby the lift 27 may be raised and lowered without obstruction. However, upon rotation of the lift 27, the frame work 22 is caused to rotate through the turn table 23 in said lift to cause the ram 25 to always operate in a plane at right angles to the axis of the shaft 166.

The operation of the invention is as follows. By driving the shafts 319 in the proper direction, the rollers 317 are caused to advance the pole along the conveyor 20 until the butt end thereof enters into the space above the lift 27 and within the frame work 22. Both the lift 27 and lift 28 are normally in their lowermost positions and below the elevation of the rollers 317 so that the pole when delivered to the machine does not engage said lifts. When the pole is properly positioned the lifts 27 and 28 are simultaneously operated to elevate the pole to the desired elevation. The pole when properly elevated engages the two chains 213 and 214 as best shown in Fig. 1, said pole resting upon the various rollers 171, 172, 328 and 329. Due to the mounting of the rollers 171 and 172 upon the shaft trunnions 170 which in turn are rotatably mounted upon the shaft 166, said rollers adjust themselves to fit the countour of the poles so that all of the rollers carry an equal portion of the weight of the pole. In the event that the pole be crooked as frequently occurs the weight of the pole causes the entire lift 27 through engagement with the rollers 171 and 172 to turn until the shaft 166 is normal to a vertical plane passing through the axis at the particular locality thereof engaged by said rollers. Such rotation of the lift 27 is also transmitted to the frame 22 through the slot 337 in shaft 166 and the spline 336 of the T-bar 335. The ram 25 is hence rotated with the lift 27 so that the punches 26 thereof engage the pole 177 along the upper element of the portion thereof resting upon the lift 27. The motor 267 is next started in the customary manner and the feeding mechanism of the invention brought into action. The operation of the motor 144 rotates shaft 128 through the spur pinion 145 on the motor armature shaft 146 and through the spur gear 143 on the crank shaft 128. This causes the crank pins 133 to reciprocate the ram 125 forcing the punches 26 into the surface of the wood and puncturing the outer surface or skin thereof. If the surface of the pole engaged by the punches 26 be irregular, the reaction to the various punches is equalized so that the same force is employed on each of the punches regardless of its position causing all the punches to penetrate the surface of the pole to the same depth. Where one of the punches strikes a knot this punch fails to penetrate to the same depth as the other punches but does not interfere with the operation of the remaining punches which function in the ordinary manner. As the shaft 128 rotates, the shaft 256 is driven through the bevel gear 267 and the bevel pinion 266 whereby the connecting rod 281 is operated to give the ratchet wheel 290 a step by step rotation as previously brought out. The disc 288 is rotated through the chain 306 and brings the cam surface 303 thereof in the path of movement of the cam member 305 for alternate movement of the connecting rod 287 so that said connecting rod only moves the ratchet wheel every other power stroke. In this manner, the shaft 252 is alternately rotated and moved at a very high rate of speed so that ample time is allowed for bringing the ram 25 into operating position and retracting the same from engagement with the pole. Due to the fact that the pole is usually larger at one end than the other the differential mechanism 196 is brought into action to equalize the rotation of the pole at the two portions thereof engaged by the chains 213 and 214 through the shafts 194 and 195. In this manner the pole is easily and uniformly turned to present successive elements thereof for engagement with the ram. It is to be noted that the circumferential spacing of the rows of holes made by the punching tools 26 may be varied by loosening the nut 280 on the connecting rod 281 and sliding the bolt 277 along the dovetailed slot 276 of the disc 274. By then tightening said bolt the device operates as previously described. In this manner any degree of spacing within the range of the machine can be procured. The puncturing and turning operation of the machine continues as long as the motor 144 operates. When the entire surface of the pole has been punctured the lifts 27 and 28 are lowered until the pole engages the rollers 317 of the conveyor 20. The pole may then be advanced within the puncturing machine by starting conveyor 20 until a new area of the pole is presented for engagement with the punches 26 of the ram. The conveyor 20 is then stopped and the lifts 27 and 28 raised to again bring a different portion of the pole into engagement with the pole turning chains 213 and 214 whereby the new portion of the pole presented is punched in identically the same manner. This operation may be continued until the pole has been punctured for the desired depth after which the lifts 27 and 28 are fully lowered and the pole disengaged from the machine through the two conveyors 20 and 31. It is to be noted in the operation of the device that as the pole is turned by the two chains 213 and 214 where a crooked pole is being punctured, the weight of the pole upon the lift 27 is sufficient to swing said lift about its vertical axis to cause the rollers 171 and 172 to conform to the surface of the pole. This swings the frame work 22 and the ram 25 with it causing the punches 26 to always engage the surface of the pole along an element thereof at the locality being punctured.

The advantages of our invention are manifest. An extremely positive device is provided whereby the pole is effectively punctured to permit of the rapid penetration of the preserving fluid into the pores of the pole. The feeding of the pole is accomplished in a minimum length of time so that ample time is available for the operation of the ram by means of which the pole is punctured. The machine is adjustable to accommodate different sizes of poles. By mounting the frame work on a turn table and keying the same to the lift, the frame work having the ram thereon is caused to rotate to conform to the bend in the pole whereby the puncturing devices are caused to always puncture the pole along an element thereof. By utilizing the fluid equalized punches all of the punches enter the pole to the same depth so that uniform penetration is had throughout the surface of the pole regardless of the contour thereof. Through the equalizing means disposed between the two pole turning chains no additional strain is placed upon these devices over and above what is required to feed the poles so that the difference in diameter of the pole at the two portions thereof engaged by said chains is of no consequence in the operation of the device. The invention is mechanically constructed so as to be extremely sturdy and rigid and may be driven at a relatively rapid rate to easily and quickly handle the poles in the manner described.

Changes in the specific form of the invention as herein described may be made within the scope of what is claimed without departing from the spirit of the invention.

Having described my invention what I claim as new and desire to protect by Letters Patent is:

1. A pole puncturing machine comprising a frame work, means for supporting a pole within said frame work, a ram reciprocable in said frame work toward and from said pole, means for reciprocating said ram, separate pole turning devices applicable to the pole at different localities thereon, equalizing means interposed between said pole turning devices, and means for operating said equalizing means.

2. A pole puncturing machine comprising a frame work, means for supporting a pole within said frame work, a ram reciprocable in said frame work toward and from said pole, means for reciprocating said ram, separate pole turning devices applicable to the pole at different localities, said devices each including a shaft, differential gearing between said shafts, and means for driving said differential gearing.

3. A pole puncturing machine comprising a frame work, means for supporting a pole within said frame work, a ram reciprocable in said frame work toward and from said pole, means for reciprocating said ram, separate pole turning devices applicable to the pole at different localities, said devices each including a shaft, differential gearing between said shafts including gearing on said shafts and a spider having differential pinions meshing with said gearing, and means for giving said spider a step by step rotation.

4. A pole puncturing machine comprising a frame work, means for supporting a pole within said frame work, a ram reciprocable in said frame work toward and from said pole, means for reciprocating said ram, separate pole turning devices applicable to the pole at different localities, said devices each including a shaft differential gearing between said shaft including gearing on said shaft and a spider having differential pinions meshing with said gear. a worm wheel on said spider, a worm meshing with said worm wheel, and means for giving said worm a step by step rotation.

5. A pole puncturing machine comprising means for supporting a pole, a ram reciprocable toward and from said pole, revoluble means for operating said ram, means engaging said pole for turning the same, transmission between said revoluble member and said pole turning means, said transmission including a mechanism for imparting a step by step movement to said pole turning means, said mechanism including a reciprocating member operable in one direction to move said pole turning means and idling in its movement in the opposite direction, and means for rendering said reciprocating member inoperative upon alternate power strokes thereof.

6. A pole puncturing machine comprising a frame work, a turn table for supporting said frame work, a rotatable support for a pole within said frame work, a second support for a pole without said frame work, a ram reciprocable relative to said frame work toward and from a pole carried by said supports and in a fixed relation with respect to said frame work, said frame work being bodily rotatable on said turn table to cause said ram to operate in a predetermined manner with respect to said pole regardless of the configuration of the pole.

7. A pole puncturing machine comprising a base having a plurality of rollers mounted thereon and arranged in circumferential relation, a frame work comprising a turn table including a circular track adapted to ride along said rollers, a lift within said frame work mounted on said base, each having rollers for supporting the end of a pole inserted within said frame work, said lift being rotatable with said frame work, and a ram slidably mounted on said frame work for reciprocation toward and from said pole, and a support for another portion of said pole without said frame work, said frame work adjusting itself to the bend in the pole to cause said ram to puncture said pole along elements of the surface thereof.

8. A pole puncturing machine comprising a base, a frame work, a turn table for rotatably supporting said frame work relative to said base, a lift rotatably mounted in said base having means for supporting the end of a pole, said supporting means conforming to the bend in the pole, a support without said frame work, said lift being rotated by engagement with a crooked pole, and means connecting said lift with said frame to rotate said frame upon said turn table to bring the ram in alignment with an element of said pole.

9. A pole puncturing machine comprising a base, a frame work rotatable with respect to said base, a ram reciprocable along said frame work, a lift rotatable with respect to said base and forming a support for one end of the pole, said lift being disposed within said frame work, another support for said pole without said frame work, said lift having a portion conforming to the bend in the pole for rotating said lift, and a key between said frame work and lift for rotating said frame work to bring said ram in alignment with an element of the surface of the pole to be punctured.

10. A pole puncturing machine comprising a base, a turn table rotatable relative thereto, a frame work mounted on said turn table and carried thereby, an elongated ram reciprocable along said frame work, a lift within said frame work rotatable relative thereto, said lift comprising a horizontal shaft, transverse shafts rotatable on said horizontal shaft, rollers on said transverse shaft for supporting a pole within said frame work, and a key for connecting said horizontal shaft with said frame work for rotating said frame work upon rotation of said lift.

11. A pole puncturing machine comprising a base, a turn table rotatable relative thereto, a frame work mounted on said turn table and carried thereby, an elongated ram reciprocable along said frame work, a lift within said frame work rotatable relative thereto, said lift comprising a horizontal shaft, transverse shafts rotatable on said horizontal shaft, rollers on said transverse shaft for supporting a pole within said frame work, said horizontal shaft having a slot in the end thereof, and a spline secured to said frame work and slidable along said slot for causing the rotation of said frame work upon rotation of said lift.

12. A pole puncturing machine comprising a base, a turn table rotatable relative thereto, a frame work mounted on said turn table and carried thereby, an elongated ram reciprocable along said frame work, a lift within said frame work rotatable relative thereto, said lift comprising a horizontal shaft, transverse shafts rotatable on said horizontal shaft, rollers on said transverse shaft for supporting a pole within said frame work, and means for moving said transverse shafts along said horizontal shaft to vary the spacing of said rollers.

13. A pole pucturing machine comprising a lift adapted to support a pole, a bearing for rotatably supporting said lift, a frame work supporting a pole puncturing device adapted to puncture a pole supported upon said lift, means for rotatably supporting said frame independently of said bearing and means operated by said lift for causing rotational movement of said frame corresponding to the rotation of said lift.

14. A pole puncturing machine comprising a lift adapted to support a pole, means for rotatably supporting said lift for rotating movement and for vertical movement, said lift being independently raisable and rotatable, a frame having a pole puncturing device thereon, means for supporting said frame for rotation about the same axis as said lift and means for simultaneously rotating said lift and frame at all vertical positions of said lift.

15. A pole puncturing machine comprising a frame work, a puncturing device carried by said frame work, means for supporting a pole in a position to be engaged by said puncturing device, separate pole turning devices applicable to the pole at different localities, means for driving said pole turning devices and equalizing means between said pole turning devices for procuring relative movement therebetween.

16. A pole puncturing machine comprising a frame work, a puncturing device carried by said frame work, means for supporting a pole in a position to be engaged by said puncturing device, separate pole turning devices applicable to the pole at different localities, said devices each including a shaft differential gearing between said shafts including gearing on said shafts and a spider having differential pinions meshing with said gearing and means for giving said spider a step by step rotation.

17. A pole puncturing machine comprising two pairs of rollers for supporting a pole, two members for rotatably supporting said rollers, a support, and means for supporting said members for swinging movement, said means including a shaft, the axis of said shaft and the axes of said roller lying in substantially a single plane.

18. A pole puncturing machine comprising means for supporting a pole, a ram reciprocable toward and from said pole, revoluble means for operating said ram, means engaging said pole for turning the same, transmission between said revoluble member and said pole turning means, said transmission including a mechanism for imparting a step by step movement to said pole turning means, said mechanism including a reciprocating member operable in one direction to move said pole turning means and idling in its movement in the opposite direction, and means for rendering said reciprocating member inoperative during certain of the power strokes thereof.

19. A pole puncturing machine comprising a lift having a vertically movable member, a horizontal shaft carried by the upper part of said member, supports rotatable about the axis of said horizontal shaft, rollers rotatably supported on said support for supporting a pole, said rollers being tiltable about the axis of said first named shaft to conform to the vertical bend of said pole and said vertical member being rotatable to cause the rollers to conform to the horizontal bend of the pole, the axis of said shaft and the axis of said rollers lying below the pole carried on the rollers, and means for puncturing a pole while supported on said rollers.

20. A pole puncturing machine comprising a lift having a vertically movable member, a horizontal shaft carried by the upper part of said member, supports rotatable about the axis of said horizontal shaft, rollers rotatably supported on said support for supporting a pole, said rollers being tiltable about the axis of said first named shaft to conform to the vertical bend of said pole and said vertical member being rotatable to cause the rollers to conform to the horizontal bend of the pole, said supports carrying the rollers being longitudinally adjustable along said first named shaft, means for retaining said rollers in adjusted position on said shafts and means for puncturing a pole while supported on said rollers.

In testimony whereof we have affixed our signatures.

HARRY E. CULLEN.
EDWIN G. MONSON.